US009243121B2

(12) United States Patent
Buri et al.

(10) Patent No.: US 9,243,121 B2
(45) Date of Patent: Jan. 26, 2016

(54) PROCESS FOR MANUFACTURING HIGH SOLIDS SUSPENSIONS OF MINERAL MATERIALS

(71) Applicants: Matthias Buri, Rothrist (CH); Patrick A. C. Gane, Rothrist (CH)

(72) Inventors: Matthias Buri, Rothrist (CH); Patrick A. C. Gane, Rothrist (CH)

(73) Assignee: Omya International AG, Oftringen (CH)

( * ) Notice: Subject to any disclaimer, the term of this patent is extended or adjusted under 35 U.S.C. 154(b) by 0 days.

(21) Appl. No.: 14/227,355

(22) Filed: Mar. 27, 2014

(65) Prior Publication Data

US 2014/0213711 A1    Jul. 31, 2014

Related U.S. Application Data

(62) Division of application No. 13/698,296, filed as application No. PCT/EP2011/058649 on May 26, 2011, now Pat. No. 8,721,838.

(60) Provisional application No. 61/472,713, filed on Apr. 7, 2011.

(30) Foreign Application Priority Data

May 28, 2010   (EP) .................................... 10164211

(51) Int. Cl.
| | | |
|---|---|---|
| C08K 3/26 | (2006.01) |
| C09C 1/02 | (2006.01) |
| C09C 1/42 | (2006.01) |
| C09C 3/04 | (2006.01) |
| D21H 17/00 | (2006.01) |
| D21H 17/67 | (2006.01) |
| D21H 19/00 | (2006.01) |
| C09D 7/12 | (2006.01) |
| D21H 19/38 | (2006.01) |

(52) U.S. Cl.
CPC . *C08K 3/26* (2013.01); *C09C 1/021* (2013.01); *C09C 1/028* (2013.01); *C09C 1/42* (2013.01); *C09C 3/04* (2013.01); *C09D 7/1216* (2013.01); *D21H 17/00* (2013.01); *D21H 17/67* (2013.01); *D21H 19/00* (2013.01); *C01P 2004/61* (2013.01); *C01P 2004/62* (2013.01); *C01P 2006/12* (2013.01); *C01P 2006/22* (2013.01); *D21H 19/38* (2013.01)

(58) Field of Classification Search
USPC ............ 162/164.7, 135, 158, 181.2; 524/425, 524/556; 523/333
See application file for complete search history.

(56) References Cited

U.S. PATENT DOCUMENTS

| | | | |
|---|---|---|---|
| 4,509,987 A | 4/1985 | Farrar et al. |
| 4,840,985 A | 6/1989 | Gonnet et al. |
| 6,003,795 A | 12/1999 | Bown et al. |
| 6,402,824 B1 | 6/2002 | Freeman et al. |
| 2006/0106118 A1 | 5/2006 | Husband et al. |
| 2006/0287423 A1 | 12/2006 | Michl et al. |
| 2009/0111906 A1 | 4/2009 | Jacquemet et al. |
| 2009/0306266 A1 | 12/2009 | Creamer et al. |
| 2011/0105670 A1 | 5/2011 | Gane et al. |

FOREIGN PATENT DOCUMENTS

| | | |
|---|---|---|
| EP | 0046573 A1 | 3/1982 |
| EP | 0100947 A1 | 2/1984 |
| EP | 0100948 A1 | 2/1984 |
| EP | 0108842 A1 | 5/1984 |
| EP | 0129329 A2 | 12/1984 |
| EP | 0261039 A1 | 3/1988 |
| EP | 0542643 A1 | 5/1993 |
| EP | 0542644 A1 | 5/1993 |
| EP | 0614948 A1 | 9/1994 |
| EP | 0717051 A1 | 6/1996 |
| EP | 0850685 A2 | 7/1998 |
| EP | 0857763 A1 | 8/1998 |
| EP | 0614948 B1 | 8/1999 |
| EP | 1160201 A1 | 12/2001 |
| EP | 2143688 A1 | 1/2010 |
| EP | 2194103 A1 | 6/2010 |
| WO | 9112278 A1 | 8/1991 |
| WO | 9200347 A1 | 1/1992 |
| WO | 9710309 A1 | 3/1997 |
| WO | 0039029 A2 | 7/2000 |
| WO | 0249766 A2 | 6/2002 |
| WO | 2007072168 A1 | 6/2007 |
| WO | 2008010055 A1 | 1/2008 |
| WO | 2010004405 A1 | 1/2010 |

OTHER PUBLICATIONS

International Search Report, dated Jun. 24, 2011 for PCT Application No. PCT/EP2011/058649.
Written Opinion of the International Searching Authority, dated Jun. 24, 2011 for PCT Application No. PCT/EP2011/058649.
Notice of Opposition for corresponding European Patent No. EP2390284, Feb. 2012.
Third Party Observations dated Jun. 18, 2014 for European Application No. EP 11722057.4.
Submission by the Opponent dated Jun. 9, 2014 for European Application No. EP 10164211.4.
Response to the Communication of Notices of Opposition dated Jul. 30, 2013 for European Application No. EP 10164211.4.
European Search Report dated Mar. 11, 2010 for European Application No. EP 10164211.4.

*Primary Examiner* — Mark Halpern
(74) *Attorney, Agent, or Firm* — Amster, Rothstein & Ebenstein LLP

(57) ABSTRACT

The present invention relates to a process for manufacturing high solids aqueous suspensions of mineral materials comprising the steps of providing at least one mineral material, preparing an aqueous suspension comprising the at least one mineral material, grinding the resulting aqueous suspension, centrifuging the ground aqueous suspension, and concentrating the centrifuged product of step d) by flash cooling; the high solids aqueous suspension of mineral materials obtained by this process, as well as the use thereof.

18 Claims, No Drawings

PROCESS FOR MANUFACTURING HIGH SOLIDS SUSPENSIONS OF MINERAL MATERIALS

CROSS-REFERENCE TO RELATED APPLICATIONS

This is a divisional of U.S. application Ser. No. 13/698,296 filed Dec. 18, 2012, which is a U.S. national phase of PCT Application No. PCT/EP2011/058649, filed May 26, 2011, which claims priority to European Application No. 10164211.4, filed May 28, 2010 and U.S. Provisional Application No. 61/472,713, filed Apr. 7, 2011, the entirety of which are hereby incorporated by reference.

The present invention relates to a process for manufacturing high solids suspensions of mineral materials, the high solids aqueous suspension of mineral materials obtained by this process, as well as the use of such suspensions.

In the manufacturing method of a sheet of paper, cardboard or analogous product, one skilled in the art increasingly tends to replace part of the expensive cellulose fibres by cheaper mineral matter in order to reduce the cost of the paper while improving its properties such as opacity and/or brightness.

Such well-known mineral materials, comprise for example natural calcium carbonate, synthetic calcium carbonate, and miscellaneous analogous fillers containing calcium carbonates such as dolomite or mixed carbonate based fillers; various matter such as talc or analogues; mica, clay, titanium dioxide, etc.

For reasons of applicability, transport, storage and drying cost, it is especially useful to produce the mineral material in the form of high solids suspensions, i.e. containing only little water, which, however, generally is only possible by adding a high amount of dispersing agents or grinding aids.

Thus, for a long time, it has been common to use in a wet grinding process, as dispersing agents, water soluble polymers based on partially or totally neutralised polyacrylic acids or their derivatives (EP 0 046 573, EP 0 100 947, EP 0 100 948, EP 0 129 329, EP 0 261 039, EP 0 516 656, EP 0 542 643, EP 0 542 644, EP 0 717 051) to provide aqueous mineral suspensions that meet the desired refinement and low viscosity criteria. These dispersing agents, however, have to be used in a high quantity, which is not only not desirable from the economical view, but also disadvantageous with respect to the capability of the final product of developing scattering visible light as required by the end user in paper application. Consequently, there are several approaches in the prior art to provide high solids suspensions of mineral materials, wherein the amount of the dispersing agents above is decreased, and the mentioned drawbacks are avoided or reduced.

For example, WO 02/49766, EP 0 850 685, WO 2008/010055, WO 2007/072168 disclose processes for manufacturing aqueous suspensions of refined mineral material, with a dry matter concentration that can be high, while having a low Brookfield™ viscosity that remains stable over time. In this respect, the use of specific dispersants like copolymers of acrylic acid with maleic acid, of a particular rate of neutralization, or the use of inorganic fluorine compounds to be put into aqueous suspensions of the mineral particles issuing from the mechanical and/or thermal concentration step following a step of wet grinding at a low solid content without the use of dispersing agent nor grinding aid, are mentioned.

Furthermore, unpublished European patent application No. 08 172 465 discloses the use of lithium-neutralised water-soluble organic polymers acting as grinding and/or dispersing capacity enhancers in order to achieve aqueous mineral material suspensions with the required properties while minimizing the dispersant and/or grinding aid agent demand without decreasing the properties of the final products like the optical properties of the paper.

A further approach is mentioned in EP 0 614 948 or in EP 0 857 763 relating to a process for comminuting in the wet state alkaline earth metal pigments, in particular, but not exclusively, calcium carbonate pigments, by preparing an aqueous suspension of a particulate alkaline earth metal compound, subjecting this suspension to attrition grinding with a particulate grinding medium under conditions such as to yield a product having a particle size distribution such that at least 90% by weight of the particles have an equivalent spherical diameter smaller than 2 µm; and allowing water to evaporate from the suspension under the action of heat contained in the suspension until the percentage by weight of dry alkaline earth metal compound in the suspension has increased to at least 70% by weight, at an initial solids concentration of from 40 to 70 wt %. It can be taken from the Examples that the use of a suspension having an initial solids content of above 70 wt % is not suitable for the claimed process using 0.7 wt %. Thus, EP 0 614 948 describes a process for grinding mineral material at a high solids content clearly indicating that this process is only suitable for suspension having an initial solids content of not more than 70 wt %.

Thus, the processes known in the prior art either still use a relatively high amount of dispersant, or are only suitable for suspensions of mineral materials having a relatively low solids content, and thus being not very efficient.

Consequently, it is one object of the present invention to provide a process for manufacturing high solids aqueous suspensions of mineral material using a reduced amount of dispersant and having a low Brookfield viscosity.

This object is achieved by a process for manufacturing high solids aqueous suspensions of mineral material(s) comprising the steps of:
a) providing at least one mineral material,
b) preparing an aqueous suspension comprising the at least one mineral material of step a),
c) grinding the mineral material of the resulting aqueous suspension of step b),
d) concentrating the aqueous suspension of ground mineral material of step c) by flash cooling.

Mineral materials suitable for the use in the process according to the present invention are preferably selected from the group comprising natural calcium carbonate (GCC) such as marble, chalk, limestone; precipitated calcium carbonate (PCC) such as aragonitic PCC, vateritic PCC and/or calcitic PCC, especially prismatic, rhombohedral or scalenohedral PCC; surface modified calcium carbonate; dolomite; talc; bentonite; clay; magnesite; satin white; sepiolite, huntite, diatomite; silicates; and mixtures thereof.

It is preferred that from 40 to 85 wt %, preferably from 45 to 80 wt %, more preferably from 50 to 75 wt %, most preferably from 60 to 70 wt %, e.g. 65 wt % of the at least one mineral material particles provided in step a) have an equivalent spherical diameter of <10 µm, measured by means of a Sedigraph 5100 device from the company Micromeritics, USA, in an aqueous solution of 0.1 wt-% $Na_4P_2O_7$, wherein the samples were dispersed using a high-speed stirrer and ultrasound.

According to step b) of the process of the present invention, an aqueous suspension is prepared from the mineral material provided in step a).

This aqueous suspension, before it is subjected to step d), preferably has a solids content of from above 70 to 80 wt %, especially from 72 to 79 wt %, more preferably from 74 to 78 wt %, and most preferably from 76 to 78 wt % based on the total weight of the suspension.

Subsequently, the aqueous suspension of mineral material(s) is subjected to a grinding step, which may be performed in any of the known grinding equipment with which those skilled in the art are familiar for grinding mineral materials.

Especially conventional attritor mills such as those distributed by the company Dynomill are suitable in this respect, preferably using grinding balls made of glass, porcelain, and/or metal; especially preferably, however, grinding balls are used made of, e.g., zirconium silicate, zirconium dioxide and/or baddeleite with a diameter of 0.2 to 5 mm, preferably 0.2 to 2 mm, but also 0.5 to 5 mm, e.g., 1 to 2 mm. Quartz sand having an equivalent spherical diameter of 0.1 to 2 mm may also be used.

In a special embodiment, at least one dispersing agent, which preferably also act as a deflocculation agent, is added to the aqueous suspension of step b), wherein, the at least one dispersing agent may be completely added before grinding step c), or stepwise before and during grinding step c), and optionally also before and during and/or after grinding step c).

Useful amounts of such dispersing agents added to the aqueous suspension during step b), during and after step b), but before step c), are from 0.01 to 1.25 wt %, preferably from 0.01 to 0.1 wt %, more preferably from 0.02 to 0.07 wt %, most preferably from 0.03 to 0.05 wt % based on the dry weight of the mineral material. Preferred amounts of such de-flocculation agents additionally added during step c) are from 0.05 to 1 wt %, more preferably from 0.1 to 0.7 wt %, even more preferably from 0.15 to 0.55, e.g. 0.3 wt % based on the dry weight of the mineral material.

The total amount of the at least one dispersing agent added before grinding step c), or before and during step c), or before and during and/or after grinding step c), preferably is from about 0.01 to 1.25 wt %, more preferably 0.05 to 1 wt %, even more preferably 0.1 to 0.7 wt %, most preferably 0.3 to 0.5 wt % based on the dry weight of the mineral material.

In another preferred embodiment, the dispersing agent is added in an amount such that, with respect to the specific surface area, measured by BET, of the ground material after step c), it is present in amount of below 0.15 mg/m$^2$, e.g. 0.05 to 0.08 mg/m$^2$, if it is added before grinding step c), and, in an amount of from 0.05 mg/m$^2$ to 1.5 mg/m$^2$, e.g. 0.5 to 0.8 mg/m$^2$, if it is added during grinding step c).

Dispersing agents, which may be used with respect to step b) and c) may be those selected from the group comprising homopolymers or copolymers of polycarboxylic acids such as acrylic or methacrylic acids or maleic acid; and/or their salts, e.g. partially or completely neutralized acid salts with sodium, lithium, potassium, ammonium, calcium, magnesium, strontium and/or aluminium or mixtures thereof, preferably sodium, calcium and magnesium; or derivatives of such acids such as esters based on, e.g., acrylic acid, methacrylic acid, maleic acid, fumaric acid, itaconic acid, e.g. acryl amide or acrylic esters such as methylmethacrylate, or mixtures thereof; alkali polyphosphates; or mixtures thereof.

The molecular weight Mw of such products is preferably in the range of from 1000 to 15000 g/mol, more preferably in the range of from 3000 to 7000 g/mol, e.g. 3500 g/mol, most preferably in the range of from 4000 to 6000 g/mol, e.g. 5500 g/mol.

In a preferred embodiment, before, during, or after step c), but before step d), at least one earth alkali oxide and/or hydroxide, preferably lime and/or burnt dolomite is added to the aqueous suspension of step b), wherein lime in the context of the present invention comprises calcium oxide and calcium hydroxide.

Only small amounts of earth alkali oxide and/or hydroxide are sufficient to be used during grinding, such as amounts of from about 0.001 to 0.1 wt %, preferably 0.005 to 0.07 wt %, more preferably 0.007 to 0.05 wt %, most preferably 0.01 to 0.03 wt %, e.g. 0.02 wt % based on the dry weight of the mineral material.

Grinding step c) may be carried out once or several times. For example, the aqueous suspension may be partially ground in a grinder, the suspension of partially ground mineral material may then be fed to a second grinder for further grinding, etc., until the desired particle size is obtained. The desired particle size can also be obtained in one step by adjusting the residence time in the grinder.

It is possible to grind the mineral material such that from 20 to 70 wt %, preferably from 36 to 68 wt %, more preferably from 40 to 60 wt %, e.g. 50 wt % of the at least one mineral material particles have a particle size of <2 µm after step c).

In an even more preferred embodiment, the mineral material may be ground such that from 10 to 90 wt %, preferably from 20 to 80 wt %, more preferably from 36 to 75 wt %, especially from 40 to 70 wt %, most preferably from 50 to 65 wt %, e.g. 55 wt % of the at least one mineral material particles have a particle size of <1 µm after step c).

Furthermore, the aqueous suspension of ground mineral material may also be subjected to a separation step after grinding, wherein a finer fraction is separated from a coarser fraction, just as desired within the above-mentioned equivalent spherical diameter ranges of the mineral material.

The separation may take place by means of well-known techniques such as screening, filtration, or centrifugation, wherein for the most applications centrifugation will be preferred, using commonly known equipment.

In this respect, it is also possible that the separated coarse fraction is re-circulated into any one of one to several grinders of step c).

Subsequently, in step d), the aqueous suspension of the ground, and optionally separated, mineral material is concentrated by flash cooling. Flash cooling in the context of the present invention is carried out by allowing water to evaporate from the aqueous suspension under the action of heat contained in the suspension.

This may take place by the heat which has been generated in the suspension as a direct result of the grinding. For example, during the grinding step the temperature of the suspension may rise to the boiling point of the aqueous phase of the suspension, and the evaporation of water occurs naturally under the action of the heat contained in the suspension. In this respect, the temperature generated by grinding may also be below the boiling point of the water contained in the suspension. The heat contained in the suspension as a result of the energy dissipated in the suspension during grinding may be sufficient to increase the percentage by weight of dry alkaline earth metal compound in the suspension to within the range from 79 to 85 wt % as mentioned below.

Alternatively or additionally, the suspension may be heated by a heating means such as a heat exchanger to a temperature within the range of from 50° C. to the boiling point of the suspension, preferably to within the range of from 60 to 90° C., more preferably from 70 to 85° C., e.g. from 81 to 83° C.

For instance, heat may be supplied to the suspension by passing the suspension through one side of a non-contact heat exchanger through the other side of which is passed a hot fluid, preferably at a temperature in the range from 50 to 100° C.

Basically, known flash cooler systems consist of a (vacuum) chamber, into which the suspension is fed. Depending upon the temperature and the vacuum, the water in the suspension will evaporate. The evaporation results in an increase of the solids content. Cooling will take place simultaneously.

In this respect, the temperature of the aqueous suspension at the inlet of the grinder may be from 20 to 80° C., preferably from 20-50° C., and at the outlet of the grinder, preferably of from 80 to 105° C.

Thus, the temperature of the aqueous suspension at the inlet of the flash cooler may be from 70 to 105° C., e.g. 95° C. and at the outlet of the flash cooler less than 60 to 30° C., e.g. 35° C.

Advantageously, the aqueous suspension is exposed to reduced pressure, preferably to a pressure of from 200 to 500 mbar, more preferably of from 250 to 400 mbar, most preferably a pressure of from 288 to 360 mbar, e.g. of from 300 to 350 mbar.

The final solids content of the aqueous suspension obtained after step d) preferably is from 79 to 85 wt %, especially from 79.5 to 84 wt %, more preferably from 80 to 83 wt %, e.g. 82 wt %.

With respect to the initial solids content of step b), it is thus preferred that the final solids content of the aqueous suspension after step d) is at least 1 wt %, preferably at least 2 wt %, more preferably at least 3 wt % higher than the initial solids content of the aqueous suspension obtained in step b).

In an especially preferred embodiment, the initial solids content of an aqueous suspension of mineral material of 76 to 78 wt % is raised to 80 to 81 wt % by the process of the present invention, wherein the mineral material preferably is comminuted such that while initially 66 wt % of the mineral material particles have an equivalent spherical diameter of <10 μm, 36 to 65 wt % of the final mineral material produced according to the process of the present invention have an equivalent spherical diameter of <2 μm, and preferably even <1 μm.

Furthermore, in an especially preferred embodiment, the Brookfield viscosity of the final aqueous suspension after step d) measured at 23° C. after 1 minute of stirring by the use of a RVT model Brookfield™ viscosimeter at room temperature and a rotation speed of 100 rpm with the appropriate spindle is from 50 to 1000 mPa·s, preferably 100 to 750 mPa·s, more preferably from 150 to 600 mPa·s, most preferably from 200 to 460 mPa·s, e.g. 300 mPa·s.

A second aspect of the present invention is the provision of a high solids aqueous suspension of mineral material(s) obtained by the process as described above.

In this respect, a high solids aqueous suspension of mineral material obtained by the process of the present invention especially preferably has a solids content of from 80 to 81 wt %, wherein 36 to 65 wt % of the mineral material have an equivalent spherical diameter of <2 μm, and preferably even <1 μm.

Furthermore, a third aspect of the present invention is the use of the high solids aqueous suspension of mineral materials obtained by the process as described above in paper, paper coating colours, paints and plastics.

The following examples and experiments serve to illustrate the present invention and should not restrict it in any way.

EXAMPLES

Example 1

Natural ground calcium carbonate (limestone from Orgon, France), 66 wt % of which having an equivalent spherical diameter of <10 μm, were suspended in water together with 0.07 wt %, based on the dry weight of calcium carbonate, of a sodium polyacrylate of Mw=3500 g/mol until a solids content of 76 wt % based on the total weight of the suspension was reached.

The resulting aqueous suspension was ground in a vertical cylindrical 7 m$^3$ volume wet mill, using 15 tons of zircon dioxide grinding media having a medium diameter of about 1-2 mm, using additional dispersant (polyacrylate of Mw=5500 g/mol, wherein 70 mol % of the carboxylic groups are neutralized by sodium, and 30 mol % by calcium) in a quantity of 0.15 wt %, based on the dry weight of calcium carbonate, until 62 wt % of the calcium carbonate particles had an equivalent spherical diameter of <2 μm, and 36 wt %<1 μm, respectively. The specific surface area of the dry calcium carbonate, measured by BET, was 7.1 m$^2$/g.

Subsequently, the ground calcium carbonate suspension was continuously centrifuged in a conventional continuous centrifuge at a speed of 1200 rpm.

The centrifuged aqueous suspension having a solids content of 76 wt % was fed into a continuously running flash cooler. The feeding speed was adjusted to reach approximately 80 wt % slurry solids at the outlet and concentrated at the following conditions:

Pressure at the top of the flash cooler: 288 mbar
Pressure at the bottom of the flash cooler: 350 mbar
Temperature at the entry of the flash cooler: 83° C.
Temperature at the exit of the flash cooler: 39° C.

The final solids content after the concentration step was determined to be 80 wt % by drying 20 g of the suspension in an oven at 110° C. to weight constancy ±0.1 wt %.

The Brookfield viscosity of the final aqueous suspension measured after 1 minute of stirring by the use of a RVT model Brookfield™ viscosimeter at room temperature and a rotation speed of 100 rpm with a spindle No. 3 at the exit of the flash cooler was 150 mPa·s; 153 mPa·s after 24 hours, and 162 mPa·s after 3 days.

Example 2

Natural ground calcium carbonate (limestone from Orgon, France), 66 wt % of which having an equivalent spherical diameter of <10 μm, were suspended in water together with 0.07 wt %, based on the dry weight of calcium carbonate, of a sodium polyacrylate of Mw=3500 g/mol until a solids content of 78 wt % based on the total weight of the suspension was reached.

The resulting aqueous suspension was ground in a vertical cylindrical 7 m$^3$ volume wet mill, using 15 tons of zircon dioxide grinding media having a medium diameter of about 1-2 mm, using dispersant (polyacrylate of Mw=5500 g/mol, wherein 70 mol % of the carboxylic groups are neutralized by sodium, and 30 mol % by calcium) in a quantity of 0.15 wt %, based on the dry weight of calcium carbonate. Then, a second grinding pass was carried out in a vertical cylindrical 7 m$^3$ volume wet mill, using 15 tons of zircon dioxide grinding media having a medium diameter of about 0.7-1.5 mm, using additional dispersant (polyacrylate of Mw=5500 g/mol, wherein 50 mol % of the carboxylic groups are neutralized by sodium, and 50 mol % by magnesium) in a quantity of 0.55 wt %, based on the dry weight of calcium carbonate, and 0.02 wt % based on the dry weight of calcium carbonate of lime (>97 wt % Ca(OH)$_2$), until 65 wt % of the calcium carbonate particles had an equivalent spherical diameter of <1 μm. The specific surface area of the dry calcium carbonate, measured by BET, was 12.5 m$^2$/g.

Subsequently, the ground calcium carbonate suspension was continuously centrifuged in a conventional continuous centrifuge at a speed of 1300 rpm.

The centrifuged aqueous suspension having a solids content of 78 wt % was fed into a continuously running flash cooler. The feeding speed was adjusted to reach approximately 80 wt % slurry solids at the outlet and concentrated at the following conditions:

Pressure at the top of the flash cooler: 300 mbar
Pressure at the bottom of the flash cooler: 360 mbar
Temperature at the entry of the flash cooler: 81° C.
Temperature at the exit of the flash cooler: 36° C.

The final solids content after the concentration step was determined to be 80 wt % by drying 20 g of the suspension in an oven at 110° C. to weight constancy ±0.1 wt %.

The Brookfield viscosity of the final aqueous suspension measured after 1 minute of stirring by the use of a RVT model Brookfield™ viscosimeter at room temperature and a rotation speed of 100 rpm with a spindle No. 3 at the exit of the flash cooler was 460 mPa·s; and 575 mPa·s after 6 days.

The invention claimed is:

1. A high solids aqueous suspension of mineral material obtained by the process consisting of the steps of:
   a) providing at least one mineral material comprising calcium carbonate,
   b) preparing an aqueous suspension comprising the at least one mineral material of step a),
   c) grinding the aqueous suspension of the mineral material of step b) so that from 20 to 70 wt % of particles of the mineral matter are <2 μm,
   d) optionally subjecting the aqueous suspension of ground mineral material to one or more of a separation step, screening, filtration and centrifugation; and
   e) concentrating the aqueous suspension of ground mineral material of step c), or of d) if performed, by flash cooling in a flash cooler comprising an inlet and an outlet, wherein the temperature of the aqueous suspension at the inlet of the flash cooler is from 70 to 105° C., and the temperature of the aqueous suspension at the outlet of the flash cooler is less than 60 to 30° C., to obtain an aqueous suspension having a final solids content of 80 to 85 wt % and a Brookfield viscosity, measured at 23° C. after 1 minute of stirring at 100 rpm, of from 100 to 750 mPa·s,
   wherein at least one dispersing agent is added to the aqueous suspension of step b), wherein the at least one dispersing agent is added completely before grinding step c), or stepwise before and during grinding step c), or before and during and/or after grinding step c),
   wherein the at least one dispersing agent is a homopolymer or copolymer of a polycarboxylic acid, acrylic acid, methacrylic acid or maleic acid, a partially or completely neutralized acid salt thereof that is neutralized with sodium, lithium, potassium, ammonium, calcium, magnesium, strontium, aluminium or any mixture thereof, a derivative of a polycarboxylic acid, an ester based on acrylic acid, methacrylic acid, maleic acid, fumaric acid, or itaconic, an acryl amide or acrylic ester, a methylmethacrylate, or any mixture thereof, an alkali polyphosphate, or any mixture thereof,
   wherein the total amount of the at least one dispersing agent added before grinding step c), or before and during step c), or before and during and/or after grinding step c), is from about 0.01 to 1.25 wt %, based on the dry weight of the mineral material,
   wherein optionally before, during, or after step c), but before step e), at least one earth alkali oxide and/or hydroxide is added to the aqueous suspension of step b), and
   wherein optionally before, during, or after step c), but before step e), lime and/or burnt dolomite is added to the aqueous suspension of step b).

2. The aqueous suspension of mineral material according to claim 1, wherein the at least one mineral material is natural calcium carbonate (GCC), marble, chalk, limestone, precipitated calcium carbonate (PCC), aragonitic PCC, vateritic PCC and/or calcitic PCC, prismatic PCC, rhombohedral PCC, scalenohedral PCC, or surface modified calcium carbonate, or any mixture thereof.

3. The aqueous suspension of mineral material according claim 1, wherein from 40 to 85 wt % of the at least one mineral material in step a) has particles having an equivalent spherical diameter of <10 μm.

4. The aqueous suspension of mineral material according to claim 1, wherein the aqueous suspension, before step e), has a solids content of from above 70 to 80 wt %, based on the total weight of the suspension.

5. The aqueous suspension of mineral material according to claim 1, wherein the total amount of the at least one dispersing agent added before grinding step c), or before and during step c), or before and during and/or after grinding step c), is from about 0.01 to 0.1 wt %, based on the dry weight of the mineral material.

6. The aqueous suspension of mineral material according to claim 1, wherein the molecular weight Mw of the at least one dispersing agent is in the range of from 1000 to 15000 g/mol.

7. The aqueous suspension of mineral material according to claim 1, wherein before, during, or after step c), but before step e), at least one earth alkali oxide and/or hydroxide is added to the aqueous suspension of step b).

8. The aqueous suspension of mineral material according to claim 1, wherein before, during, or after step c), but before step e), lime and/or burnt dolomite is added to the aqueous suspension of step b).

9. The aqueous suspension of mineral material according to claim 7, wherein the earth alkali oxide and/or hydroxide is added in an amount of from about 0.001 to 0.1 wt %, based on the dry weight of the mineral material.

10. The aqueous suspension of mineral material according to claim 1, wherein from 20 to 70 wt % of the at least one mineral material has particles having a particle size of <1 μm after step c).

11. The aqueous suspension of mineral material according to claim 1, wherein after grinding step c), the aqueous suspension of ground mineral material is subjected to a separation step.

12. The aqueous suspension of mineral material according to claim 1, wherein after grinding step c), the aqueous suspension of ground mineral material is subjected to screening, filtration, or centrifugation.

13. The aqueous suspension of mineral material according to claim 1, wherein in step e), the aqueous suspension is exposed to reduced pressure.

14. The aqueous suspension of mineral material according to claim 1, wherein in step e), the aqueous suspension is exposed to a pressure of from 200 to 500 mbar.

15. The aqueous suspension of mineral material according to claim 1, wherein the final solids content of the aqueous suspension obtained in step d) is from 80 to 84 wt %.

16. The aqueous suspension of mineral material according to claim 1, wherein the final solids content of the aqueous suspension obtained in step e) is at least 1 wt % higher than the initial solids content of the aqueous suspension obtained in step b).

17. The aqueous suspension of mineral material according to claim 1, wherein the final aqueous suspension after step e) has a Brookfield viscosity of from 150 to 600 mPa·s.

18. Paper, paper coating colours, paints or plastics comprising the high solids aqueous suspension of mineral material of claim 1.

* * * * *